Dec. 1, 1936.                    C. LEE                    2,062,459
                           PEENING MACHINE
                       Filed Dec. 29, 1934          3 Sheets-Sheet 1
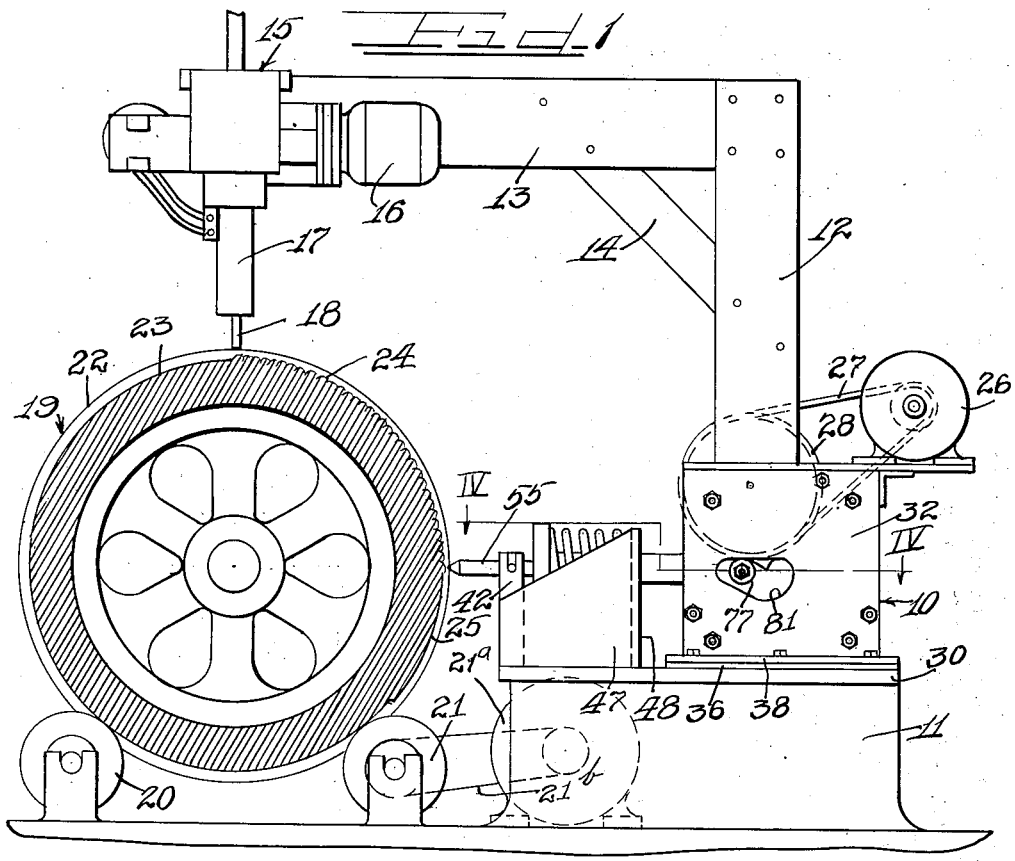
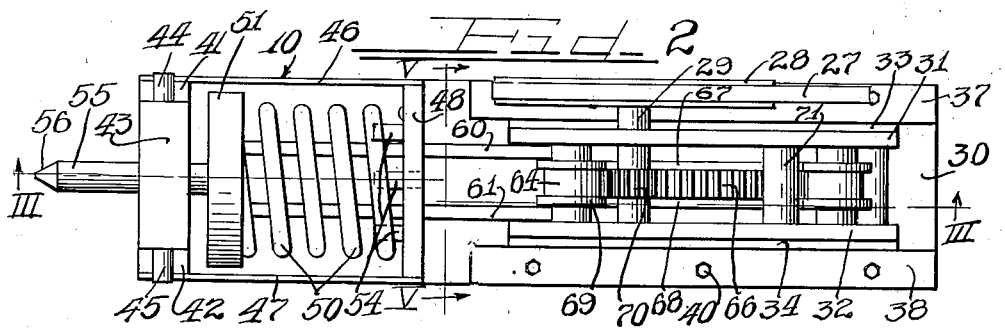
Inventor
Carl Lee
by Charles M. Willett Dec. 1, 1936.  C. LEE  2,062,459
PEENING MACHINE
Filed Dec. 29, 1934  3 Sheets-Sheet 2
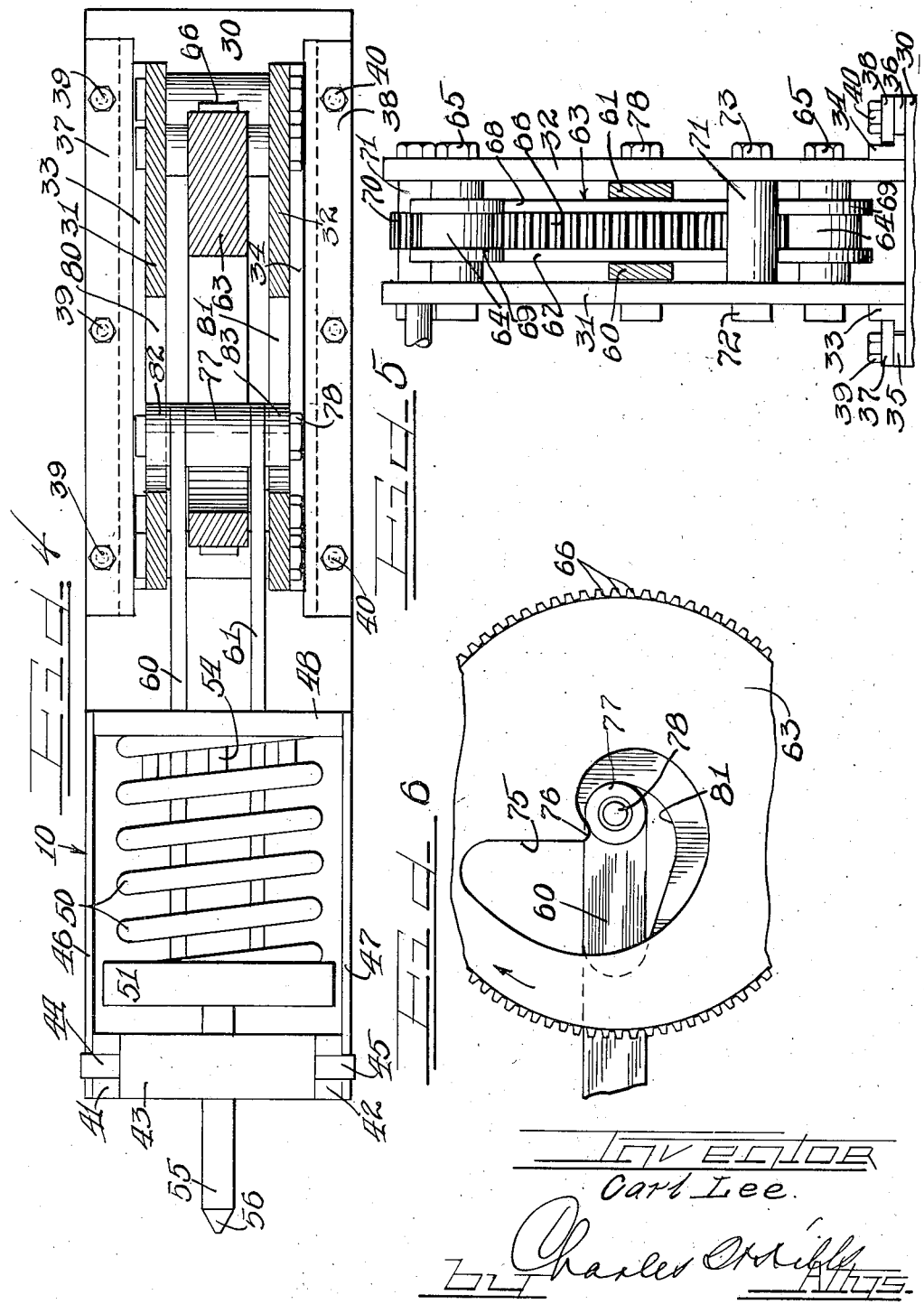

Dec. 1, 1936.  C. LEE  2,062,459
PEENING MACHINE
Filed Dec. 29, 1934  3 Sheets-Sheet 3
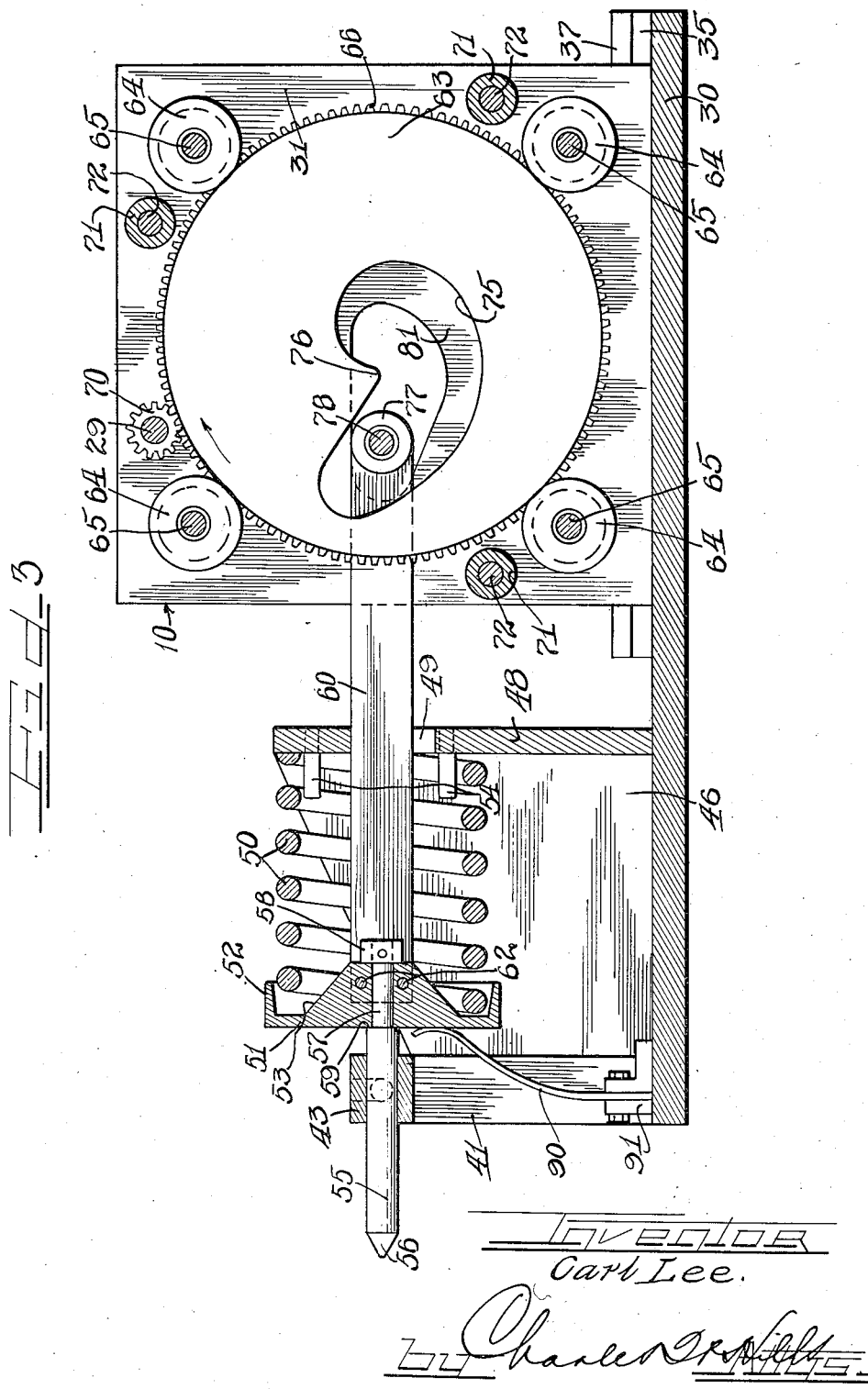
Inventor
Carl Lee.
by Charles D. Willy Patented Dec. 1, 1936

2,062,459

UNITED STATES PATENT OFFICE 2,062,459

PEENING MACHINE

Carl Lee, Chicago, Ill., assignor to Peabody Coal Company, Chicago, Ill., a corporation of Illinois Application December 29, 1934, Serial No. 759,668

11 Claims. (Cl. 78—27)

This invention relates to a machine for peening metals and the like.

More specifically, this invention relates to an automatic peening hammer adapted to impact materials with a uniform predetermined force and is so constructed that a uniform amount of power is required for all compression cycles of operation of the machine.

It is known that a large amount of shrinkage occurs when welded metal cools. This shrinkage or contraction of the metal produces disastrous results in many welding operations. For example, in the building up of worn tires on metal wheels by welding metal onto the worn tire, it sometimes happens that the shrinkage of the welded metal around the tire sets up great compression forces within the wheel and tensile stresses in the tread and flange of the wheel or tire. These tensile stresses and strains in multiple layer welding accumulate to such an extent that frequently steel tires burst and sometimes rolled steel wheels containing the retreaded tire even crack radially from their periphery to their center.

I have found that the freshly welded metal can be suitably peened to expand the welded deposit and to impart malleability thereto so that it will stretch as it shrinks during the cooling stage and thereby reduce the tensile stresses in the welded metal and parent metal on which the weld is formed. The peening of the welded metal also relieves stresses and strains within the metal itself.

According to my invention, the freshly welded metal is subjected to a series of impacts of regulated magnitude. These impacts mechanically work the freshly welded metal so as to impart malleability thereto. They also remove scale and residual matter from the surface of the weld, thereby presenting a clean surface receptive for the additional application of weld metal thereon. In addition, the beads of welded metal that are deposited during the welding operation are flattened to close the troughs between adjacent beads and provide a flat weld surface which requires only a slight machining operation to finish the surface. This, of course, effects a saving in metal because it was heretofore necessary to grind or machine off large amounts of welded metal from the corrugated weld surface to produce a finished surface.

It is therefore an object of this invention to provide a machine for working welded metals to impart desired characteristics thereto.

A further object of this invention is to provide an automatic peening machine.

Another object is to relieve stresses and strains in welded metals.

A further object of this invention is to reduce the compression forces caused by the shrinkage of welded metal.

Still another object of this invention is to provide a peening hammer adapted to deliver impact blows to materials which is so constructed that uniform power is used for all compression cycles of operation of the machine.

A further object is to improve the texture and grain structure of welded metal and to remove scale and residual matter from said metal.

A specific object of this invention is to automatically peen freshly welded metal surfaces.

Other and further objects of this invention will be apparent from the following detailed description of the annexed sheets of drawings which illustrate a preferred embodiment of this invention.

On the drawings:

Figure 1 is a side elevational view illustrating an apparatus for welding metal onto worn tires of car wheels embodying an automatic peening machine according to this invention.

Figure 2 is a top plan view of the peening machine of this invention.

Figure 3 is an enlarged cross-sectional view, with parts in elevation, taken substantially along the line III—III of Fig. 2.

Figure 4 is an enlarged cross-sectional view, with parts in elevation, taken substantially along the line IV—IV of Fig. 1.

Figure 5 is an enlarged cross-sectional view, with parts in elevation, taken substantially along the line V—V of Fig. 2.

Figure 6 is an enlarged broken elevational view showing the large gear of Figure 3 in another position.

As shown on the drawings:

In Figure 1, the reference numeral 10 indicates generally the peening hammer of this invention mounted on a base 11. The base 11 also supports a vertical standard 12 having a horizontal arm 13 secured at right angles thereto and braced by a beam 14. The arm 13 carries a welding apparatus 15 of any standard make. The welding apparatus 15, as shown, is an electric welding machine and comprises a motor 16 and an electrode feed drive and guide 17 driven by the motor 16 for holding a welding rod electrode 18 above the work to be welded and feeding said rod to the work.

A car wheel 19 is rotatably mounted beneath the welding rod electrode 18 on a pair of rollers 20 and 21. The wheel 19 has a flange 22 and a tire or wearing surface 23 which is to be rebuilt to fill in worn-away portions with welded metal. The rollers 20 and 21 contact the tire 23 of the wheel. One or both of the rollers may be driven by a motor 21a which, for convenience, is shown to be connected to the roller 21 only by means of a belt 21b. Any other driving and supporting means may be used for rotating the wheel 19 to feed the tire surface 23 to the electrode 18 at a desired rate. Welded metal from the welding rod 18 is fused to the worn tire 23 of the wheel, as indicated at 24. This welded metal 24 is allowed to cool down as the wheel 19 rotates towards the peening apparatus 10.

The apparatus 10 peens or works the welded metal 24 to flatten out the beaded portions and removes scale and residual material to produce a clean flat surface, as indicated at 25. The working of the welded metal by the peening apparatus relieves strains within the metal and malleabilizes it so that it will stretch as it shrinks during the cooling down stage. In this manner, worn tires, such as 23, may be built up to their original diameter by the welded metal without permitting the welded metal to set up excessive compression forces within the wheel.

It should be understood that the welding apparatus and attendant structure illustrated in Figure 1 may be replaced with any other type of apparatus and that my peening device is useful in many mechanical operations other than retreading steel wheels.

As shown in Figure 1, the peening device 10 is actuated by a motor 26 which drives a belt 27 to rotate a pulley 28 keyed to a shaft 29 (Figure 2) rotatably mounted in the housing enclosing the actuating portion of the device.

As shown in Figures 2 to 5, inclusive, the peening device 10 is mounted on a rectangular supporting plate 30. The actuating or eccentric trip portion of the apparatus is mounted on one end of the plate 30 encased between two vertical metal plates 31 and 32 of sufficient strength to act as the frame for rotatably mounting the various rollers and gears which are positioned between the plates. The spring driving portion of the device is mounted on the other end of the plate 30.

As best shown in Figures 2 and 5, L-shaped strips 33 and 34 are secured along the bottoms of the plates 31 and 32, respectively, with one leg thereof extending outwardly from the plates. Flat metal strips 35 and 36 (Figure 5) are secured along the side of the supporting plate 30 in abutting relation to the outwardly extending leg of the L-shaped strips 33 and 34. Flat strips 37 and 38 are placed on top of the strips 35 and 36, respectively. These strips 37 and 38 are somewhat wider than the strips 35 and 36 and abut the upstanding legs of the L-shaped members 33 and 34 so as to form, in conjunction with the strips 35 and 36, a pair of trackways for the outwardly extending legs of the L-shaped members. The strips 37 and 38 are held on the plate 30 by means of bolts 39 and 40 extending through the strips 35 and 37, 36 and 38, respectively, into threaded engagement with the plate 30. The strips 35 and 36 are preferably formed somewhat thinner than the outwardly extending legs of the L-shaped members 34 and 35 so that when the strips 37 and 38 are clamped down on top of these strips, the plates 31 and 32 will be held against longitudinal movement. It is obvious that a loosening of the bolts 39 and 40 permits a longitudinal adjustment of the plates 31 and 32 relative to the plate 30.

A housing for a coiled spring 50 and a mounting for the peening hammer rod 55 are secured on the other end of the plate 30, as shown in Figures 1 to 4, inclusive.

The mounting for the peening hammer rod 55 comprises a pair of vertical standards 41 and 42 secured, as by a weld, to each side of the end of the plate 30. A horizontal bar 43, provided with laterally extending axles 44 and 45, is pivotally mounted on these axles between the fingers of the bifurcated ends provided at the top of each standard 41 and 42.

Side plates 46 and 47 are secured to the sides of the standards 41 and 42, respectively. As shown in Figures 1 and 3, these plates 46 and 47 slope upwardly and are secured at their back ends to a vertical back plate 48 at right angles thereto which is provided with an aperture 49 (Figure 3) near the top thereof for a purpose to be hereinafter described.

The coiled spring 50 is encased within the housing formed by the vertical standards 41 and 42, the side plates 46 and 47 and the back plate 48 and a dished platen 51 having a flat outside face, an annular flange 52 extending around the periphery thereof and a frusto-conical central portion 53 (Figure 3). Pins 54 are secured in the back plate 48 and extend into the housing for holding one end of the coiled spring 50 in proper alignment against the back plate 48. The other end of the coiled spring 50 is held in alignment around the frusto-conical portion 53 of the platen 51 and is abutted on the outside thereof by the flange 52 of this platen 51.

The peening hammer rod 55 has a peening end 56 thereon and is slidable through the pivotally mounted horizontal bar 43. The peening hammer rod 55 is provided with an end portion 57 of reduced diameter which extends through the center of the platen 51 and is secured thereto by means of a nut 58 threaded around this end portion and abutting the apex of the frusto-conical portion 53. The face of the platen 51 abuts the shoulder 59 (Figure 3) formed at the junction point of the peening hammer rod 55 and the reduced portion 57 thereon.

A pair of elongated bars 60 and 61 are secured at one end thereof to the frusto-conical portion 53 of the platen 51. To facilitate a firm seating of the ends of the bars 60 and 61, the sides of the frusto-conical portion 53 may be flattened so that the ends of the bars will be seated against a flat surface and may be readily secured to the platen by means of pins or bolts 62 (Figure 3) extending through the frusto-conical portion 53 and the ends of the bars.

The bars 60 and 61 extend through the aperture 49 in the back plate 48 and into the space between the plates 32 and 33 of the actuating portion of the device.

A large rim supported gear 63 is rotatably mounted between the plates 31 and 32 on rollers 64 which are rotatably mounted on axles or bolts 65 extending through the plates. As best seen in Figures 2, 3 and 5, the gear 63 is provided with gear teeth 66 around the periphery thereof. The gear teeth 66, however, are located only in the central portion of the periphery and do not extend to the sides of the gear so as to provide smooth circular surfaces 67 and 68 around the periphery of the gear on each side of the gear teeth. The rollers 64 are formed with side flanges 69 on each side thereof adapted to bear against the cylindrical surfaces 67 and 68 for rotatably supporting the gear. The central portions of the rollers 64 are set back sufficiently to be maintained in spaced relationship from the gear teeth which abut the inside edges of the flanges 69 and prevent displacement of the gear.

A pinion gear 70 (Figures 3 and 5) is secured on the shaft 29 and meshes with the gear teeth 66 of the gear 63. As pointed out above, the shaft 29 is driven by the motor 26.

The plates 31 and 32 are held in proper spaced relation by a plurality of spaced sleeves 71 abutting the inside surfaces of the plates at their ends and being secured by means of bolts 72 extending through the plates. The bolts 72 are secured by means of nuts 73. These spacer sleeves 71 and bolts 72 may be placed at various points between the plates where they will not interfere with the mechanical operation of the gear mounting therein.

The center of the gear 63, as shown in Figures 3 and 6, has a cam-shaped aperture 75 cut therethrough with a rounded inturned portion 76 for a purpose to be hereinafter described.

The ends of the bars 61 and 62 which extend into the space between the plates 31 and 32 have a roller 77 rotatably mounted therebetween on a bolt or shaft 78 (Figures 3 and 6) adapted to roll along the surfaces defined by the cam aperture 75 in the gear 63.

As best shown in Figures 3 and 4, the plates 31 and 32 are provided in their central portions with openings 80 and 81 in alignment with the cam aperture 75 in the gear 63. The bolt 78 forming the axis for the roller 77, as pointed out above, extends through the ends of the bars 60 and 61 for rotatably supporting the roller 77 therebetween. As shown in Figure 4, this bolt 78 also rotatably supports a pair of circular discs 82 and 83 which abut the outer sides of the bars 60 and 61, respectively. These discs 82 and 83 are adapted to roll along the walls defining the apertures 80 and 81, respectively.

When the gear 63 is rotated in a clockwise direction, as indicated in Figures 3 and 6, the roller 77 contacts the curved surface of the cam aperture and is driven back to the position wherein the roller is retained behind the portion 76 of the cam aperture, as shown in Figure 6. A further rotation of the gear releases or trips the roller and allows the spring to expand to drive the hammer rod 55. The discs 82 and 83 ride along the walls defining the openings 80 and 81 at points where the roller 77 does not contact the cam surface of the gear. Since there is somewhat of a downward kick when the roller 77 is released from the portion 76 of the cam opening 75, the aperture 49 in the spring back plate 48 is large enough to permit a downward movement of the bars 60 and 61, as shown in Figure 3. These bars are pivoted relative to the base plate 30 by means of the horizontal bar 43.

The cam aperture 75 in the gear is designed so as to provide for a uniform power requirement during all stages of compression of the spring 50. In other words, when the spring is in expanded position, the first stages of compression of the spring do not require as much force as the last stages of compression. Therefore, the cam surface moves the roller 77 backward with more rapidity than when the spring is more compressed. In this manner, an even amount of driving force is used throughout all compression stages of operation of the device. As soon as the roller 77 is released from behind the portion 76 of the cam aperture 75, the hammer head or point 56 strikes against the weld and is retrieved as described below. The roller then immediately contacts the opposite surface of the cam aperture and the spring is immediately started on its compression cycle. Thus, the motor driving the apparatus is not allowed to run free for any appreciable period during the expansion cycle of the machine and a uniform amount of power is used for the compression cycle of operation.

As shown in Figure 3, a spring leaf 90 is mounted in a base 91 on the rectangular plate 30 at a point between the vertical standards 40 and 41. The spring leaf 90 contacts the face of the platen 51 when the spring 50 is in expanded position and is driven forward with the platen 51 on the power or impact stroke. The entire peening device is set up so that the hammer head or point 56 is spaced away from the weld a distance equal to only a part of the distance between the bar 43 and the platen 51 when the spring 50 is fully expanded. This point 56 strikes the weld and absorbs the blow before the platen 51 reaches the bar 43 and before the roller 77 strikes the cam 75 and before the rollers 82 and 83 (Fig. 4) strike the sideplates 31 and 32.

After the blow is absorbed by the point 56 striking the weld, the spring 90 retrieves the platen 51 back into contact with the spring 50 and at the same time the point 56 is drawn away from the weld so that it will not drag on the weld. The leaf spring, if desired, may be replaced by a helical spring disposed around the rod 55 between the bar 43 and platen 51.

If desired, the side plates 31 and 32 may have a bottom and two end plates welded thereto for forming an oil tight container for the gears and rollers therebetween. A top cover may also be secured on the plates. The so-formed container can then be partially filled with grease or oil for lubricating the gears and rollers.

Anti-friction ball or roller bearings may be used for mounting any or all of the rotatable parts.

The operation of the peening device may be briefly described as follows:

The plate 30 supporting the device is mounted in fixed position so that the hammer head 56 will strike the work to be peened, as described above. The actuating portion of the machine is then positioned so as to compress the spring 50 to any desired degree when the roller 77 is in its center position. This is accomplished by sliding the plates 31 and 32 in the trackways described above in proper spaced relation from the spring back plate 48. The plates 31 and 32 are then fixedly clamped with respect to the base plate 30 by tightening the bolts 39 and 40 as described above.

The means for providing relative movement between the actuating portion and the spring portion of the machine thus render it possible to vary the impact force of the machine without changing the coiled spring. In other words, the coiled spring may be compressed any amount from zero to its maximum, depending upon the relative position of the actuating portion of the device with respect to the fixed back plate 48. For maximum compression of the spring to produce a maximum impact, the slidable actuating portion of the device is moved away from the plate 48 so that the cam 75 starts to compress the spring immediately after the previous expansion stroke and compresses the spring to its maximum amount.

For lesser compression, to produce lesser impact with the same spring, the slidable actuating portion is moved toward the plate 48 so that the roller 77 is relatively nearer the center of the cam aperture 75 when released from the previous stroke. Therefore, the cam 75 does not engage the roller 77 until the gear 63 has made a part of one turn, and when the roller 77 is drawn to the center of the gear behind the cam portion 76, the spring will not be compressed to its full amount. The partially compressed spring, when released, will deliver a lesser blow. Obviously, the slidable actuating portion of the device may be moved so close to the plate 48 that the roller will remain in the center of the cam aperture 75 and a rotation of the gear 63 will not compress the spring at all. It is obvious that variations in the impact force delivered to the hammer head 56 can be provided without changing the spring 58.

It should be understood, however, that the spring may be replaced with heavier or lighter springs so that the device is capable of delivering impact blows of any desired magnitude.

When the apparatus is used in connection with the retreading of worn metal tires of metal wheels, such as car wheels, with welded metal, it has been found to be desirable to use a spring pressure of about 135 pounds and to move the hammer head back about 2⅝ inches from the work during the compression operation. When welding at a lineal speed of about 6 to 7 inches per minute, it has been found that the device should be operated so as to deliver about sixty impacts per minute. This provides an impact blow for each one-eighth inch of the welded metal, and since the point of the hammer head 56 is generally more than one-eighth inch in diameter, it follows that an impact blow is delivered to all parts of the weld surface.

The impact blows may be delivered to the welded metal when the metal is at any temperature below the freezing point. Thus, in some instances, it may be desirable to position the peening hammer immediately after the welding apparatus or to preheat the welded metal before subjecting it to the impact blows. I have obtained very excellent results in relieving stresses set up by the welded metal in car wheels that are retreaded with welded metal by peening the weld at temperatures between about 250 to 350 degrees F.

As pointed out above, the peening operation performs many desirable results in addition to the malleabilizing of the welded metal. It has been found that the peening of the weld removes scale and residual matter deposited on the weld and thereby presents a clean surface for additional application of welding material. The peening operation also flattens out the rounded beads of weld metal that are always deposited by a welding operation and thereby closes the troughs between adjacent beads of metal. This provides a flat finished surface instead of a corrugated surface and thereby reduces the necessity of excessive machining to produce the desired smooth surface.

It should be understood that it is not necessary to peen the weld metal while the same is in its heated condition, since cold working operations also produce desirable results.

The peening device is adapted to wide uses which are not limited to operations on welded metals. The device is readily adapted for any peening operation where impact blows of uniform regulated magnitude and frequency are desired.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A peening hammer comprising a housing mounted on a base, a gear rotatable in said housing, said gear having a cam aperture in the central portion thereof, a coiled spring, a driving arm extending from said spring into said housing, means on the end of said driving arm adapted to register with the walls defining the cam aperture in said gear, a hammer rod operatively connected with the other end of said spring and pivotally mounted on said base, and means for driving said gear whereby said coiled spring is alternately compressed and released to drive the hammer rod.

2. A peening hammer comprising a housing, a plurality of rollers in said housing, a gear rotatable on said rollers and having a cam-shaped aperture cut through the central portion thereof, an elongated arm extending from said housing and having a transverse end disposed in said cam opening adapted to engage with the walls defining said opening, a platen secured on the other end of said arm, a hammer rod secured to said platen, a coiled spring acting against said platen, and means for rotating said gear whereby said arm is alternately drawn into the housing by the cam action of the cam-shaped opening of the gear to compress the coiled spring and released to allow the compressed spring to force the hammer rod outwardly with an impact action.

3. An impact device comprising a base, a frame slidably mounted on said base, means for locking said frame on said base, a gear rotatably mounted in said frame, said gear having a cam-shaped aperture cut through the central portion thereof, a roller adapted to engage the walls defining said aperture, a pair of elongated arms secured at the ends thereof to said roller, a housing fixedly mounted on the other end of said base, an aperture in said housing permitting said arms to enter into the housing, a platen secured to the ends of said arms in said fixed housing, a coiled spring urged against said platen, a hammer rod extending from said platen, and means for rotating said gear whereby said arms are oscillated through the action of the walls defining the cam aperture on said roller to alternately compress and release said coiled spring for driving said hammer rod.

4. A peening machine comprising a base, a frame structure slidably mounted on said base, means for locking said frame structure relative to said base, a rim supported gear rotatably mounted in said frame structure, said gear having a cam-shaped aperture cut through the central portion thereof, a pair of elongated arms extending away from said frame, a roller disposed in said aperture between said arms rotatably mounted on the ends thereof, a platen secured to the other ends of said arms, a coiled spring urged against said platen, a hammer rod extending from said platen, a rotatably mounted support for said hammer rod, and a pinion gear for driving said centerless gear whereby said arms are alternately drawn into the housing to compress said spring and released to allow the compressed spring to expand for driving the hammer rod.

5. A peening hammer comprising a base, a pair of vertical standards secured on one end of said base, a bar rotatably supported by said standards, a hammer rod slidable through said bar, a platen fixed on the end of said rod, a back plate fixedly mounted on said base in spaced relation from said vertical standards, a coiled spring disposed between said platen and said back plate, a frame structure slidably mounted on the other end of said base, means for locking said frame structure relative to said base, a rim supported gear rotatably mounted in said frame structure, said gear having a cam-shaped aperture cut therethrough, a roller adapted to roll along the walls defining said aperture, a pair of elongated arms secured at the ends thereof to said roller, said arms extending from said frame through said coiled spring and being secured at the other ends thereof to said platen, and means for rotating said gear whereby said arms are driven back by said cam aperture to compress the spring and released by said cam aperture when the spring is compressed for delivering an impact blow to said hammer rod.

6. In an impact device of the class described, actuating mechanism comprising a pair of plates mounted in spaced relation, a gear between said plates having a cam aperture cut through the central portion thereof, a plurality of axles secured to said plates, rollers mounted on said axles engaging the periphery of said centerless gear for rotatably mounting the same between said plates, said plates having openings cut through the central portions thereof in alignment with the cam opening of said gear, a roller extending through said openings and said cam aperture, driving arms secured to said roller, and means for rotating said gear whereby said roller is alternately moved toward the center of said gear and released therefrom.

7. Actuating mechanism for an impact machine comprising a pair of metal plates mounted in spaced relation, a plurality of rollers rotatably mounted between said plates, a gear between said plates having gear teeth formed in the central portion only of its periphery whereby smooth peripheral surfaces are formed on each side of said teeth for engagement with said rollers, a cam-shaped aperture cut through the central portion of said gear, openings in the side walls of said plates in alignment with said cam-shaped aperture, a roller adapted to move back and forth in the openings of said plates and engage with the walls defining the cam-shaped opening of said gear, arms secured to said roller at the ends thereof, and means for rotating said gear whereby said arms are oscillated back and forth relative to said plates.

8. In a peening machine of the class described, a hammer rod, a coiled spring for driving said rod, an actuating mechanism to alternately compress and release said coiled spring comprising a pair of driving arms operatively connected with one end of said spring, a roller rotatably mounted between said arms at the other ends thereof, a large gear having a cam-shaped aperture cut therethrough for receiving said roller, rollers engaging the periphery of said gear for rotatably mounting the same, and means for rotating said gear whereby said arms are forced towards the center of said gear by said cam aperture engaging the roller secured to one end of said arms to compress said coiled spring and released from the center of said gear to allow the compressed coiled spring to expand and drive said hammer rod with an impact force.

9. A peening hammer comprising a base, a pair of plates in fixed spaced relation slidable on one end of said base, means for locking said plates relative to said base, a plurality of rollers rotatably mounted between said plates, a large gear having gear teeth formed in the central portion only of its periphery to define circular tracks on each side of said teeth for said rollers whereby said gear is rotatably mounted between said plates, said gear also having a cam-shaped opening cut through the central portion thereof, said plates having openings cut therethrough in alignment with said cam-shaped opening of said gear, rollers adapted to roll along the walls defining the openings on said plates, a pair of elongated arms abutting said rollers and extending from said plates, another roller mounted between said arms for engagement with the walls defining the cam-shaped opening of said gear, a platen secured to the other end of said arms, a coiled spring urged against said platen, a hammer rod extending from said platen, a pair of vertical standards secured to said platen for rotatably supporting said hammer rod, a back plate for said coiled spring having an aperture therein permitting the passage of said arms therethrough, and means for rotating said centerless gear whereby said arms are moved backward to compress said coiled spring and released when said coiled spring is compressed to the desired degree for driving said hammer rod with an impact force.

10. A peening hammer comprising a supporting base, a housing movable longitudinally along one end of said base, means for locking said housing against movement relative to the base, an eccentric trip mechanism in said housing, a vertical support fixedly secured to said base in front of said housing, a coiled spring seated at one end against said vertical support in front of said support, a plate disposed on the other end of said spring, a hammer rod carried by said plate and pivotally supported from said base and means connecting the trip mechanism with said plate whereby said spring is alternately compressed and released to drive the hammer rod and the amount of compression of the spring can be regulated by moving the housing relative to the vertical spring support.

11. An impact machine comprising a base, a trip mechanism slidable on said base, means for locking the trip mechanism in adjusted position on said base, a spring abutment on said base in front of said trip mechanism, a coiled spring having one end seated against said abutment, means connecting the other end of the spring with the trip mechanism whereby the spring is alternately compressed and released and the amount of compression of the spring is controlled by the distance said trip mechanism on said base is from said spring abutment, and a hammer rod driven by said spring.

CARL LEE.